US007142566B1

(12) United States Patent
Leyn et al.

(10) Patent No.: US 7,142,566 B1
(45) Date of Patent: Nov. 28, 2006

(54) JITTERLESS PROCESSING OF BITSTREAMS

(75) Inventors: Alexander I. Leyn, Waterloo (CA); Marc Morin, Waterloo (CA)

(73) Assignee: Cisco Systems Canada Co., Halifax (CA)

( * ) Notice: Subject to any disclaimer, the term of this patent is extended or adjusted under 35 U.S.C. 154(b) by 824 days.

(21) Appl. No.: 09/785,021

(22) Filed: Feb. 15, 2001

(51) Int. Cl.
*H04J 3/06* (2006.01)

(52) U.S. Cl. ........................ 370/509; 370/516
(58) Field of Classification Search .............. 370/389, 370/392, 503, 505, 508, 516, 468, 464
See application file for complete search history.

(56) References Cited

U.S. PATENT DOCUMENTS

| | | | | |
|---|---|---|---|---|
| 5,640,388 | A * | 6/1997 | Woodhead et al. | 370/468 |
| 5,740,186 | A | 4/1998 | Widmer | 371/37.1 |
| 5,905,732 | A | 5/1999 | Fimoff et al. | 370/516 |
| 6,002,687 | A * | 12/1999 | Magee et al. | 370/394 |
| 6,323,789 | B1 * | 11/2001 | Lawrence | 341/102 |
| 6,351,508 | B1 * | 2/2002 | Shishkoff et al. | 375/375 |
| 6,621,979 | B1 * | 9/2003 | Eerenberg et al. | 386/68 |
| 6,661,810 | B1 * | 12/2003 | Skelly et al. | 370/516 |
| 6,661,811 | B1 * | 12/2003 | Baker | 370/516 |

OTHER PUBLICATIONS

Pixstream, Inc., "Canadian Usage", Nov. 1999.
Pixstream, Inc., "Nevada Trade Show Offer for Sale", Nov. 1999.
Java.sun.com, PixStream Introduces VDSmanager Portfolio Video Networking Management Software, Jun. 7, 1999.

* cited by examiner

*Primary Examiner*—Chau Nguyen
*Assistant Examiner*—Jung Park
(74) *Attorney, Agent, or Firm*—Beyer Weaver & Thomas, LLP

(57) ABSTRACT

The present invention relates to systems and methods for processing and transmitting data that preserves the timing relationship of the data being transmitted and/or processed. In one embodiment, the present invention uses a timestamp. The timestamp stores the timing relationship of data in the bitstream as it appeared before any processing that may alter the timing relationship of the data. The data may then be processed. By storing the original timing relationship of data, before any processing that alters the timing relationship of data, the present invention allows for the recreation of the original timing relationship between data. Thus, any jitter introduced by processing the data may be removed or substantially reduced. When the bitstream is transmitted through a processing system of the present invention, the present invention allows the processing system to process data in a manner that changes the timing relationship of the data being transmitted and transmit the data while essentially maintaining the timing relationship of the data as it was received by the processing system.

23 Claims, 5 Drawing Sheets

JITTERLESS PROCESSING OF BITSTREAMS

BACKGROUND OF THE INVENTION

The present invention relates generally to systems and methods for processing data. More specifically, the present invention relates to systems and methods for processing bitstreams to avoid or substantially reduce the injection of processing jitter.

There are presently a variety of different communication channels for transmitting or transporting video, audio and other data. The channel is used to transport a bitstream, or a continuous sequence of binary bits used to digitally represent video, audio and/or data.

Since transmission of data with existing communication channels often requires excessive bandwidth, compression is an approach that has been used to make digital data more transportable. Digital video compression formats allow digitized video frames to be represented digitally in a much more efficient manner. Compression of digital video makes it practical to transmit the signal using digital channels at a fraction of the bandwidth required to transmit the original signal without compression. There is an abundant number of proprietary and public video data compression formats currently in use. Popular proprietary video compression formats include the Microsoft streaming format, QuickTime, Real-Networks, etc. Public video data compression formats include numerous international standards built upon video data compression schemes such as MPEG-1, MPEG-2, MPEG-4, H.261, H.262, H.263, H.263+, wavelet, fractal, etc.

Commonly, transmission of video data is intended for real-time playback. In order for a receiver of a transmission (e.g. a digital television) to properly decode and display the compressed data in real-time, packets included in the transmission must arrive in order and in a timely manner. Unfortunately, this is not always the case. As the packets of a bitstream traverse channels between transmitter and receiver, the spacing between packets may be altered. Undesirable variation of delays between the spacing of packets is often referred to as jitter. One precise definition of jitter is provided by the International Telecommunication Union (ITU), namely:

Jitter: Short-term variations of the significant instants of a digital signal from their ideal positions in time.

When a real-time application, such as digital television, receives packets of information, the packets are displayed as they are received. However, if a new packet arrives while previous packets are still being displayed, it is necessary to buffer the new packet. Buffering requires the use of a high-speed storage device, which adds to the cost of the display device. Conversely, if a packet arrives too late, there is an interruption in the display of the transmission, which results in quality loss of the displayed video data.

To add further complexity, a transmission may contain multiple bitstreams, each containing its own video program or content. In the case of a digital video broadcast (DVB), the content of a single bitstream may be a program such as a television show, a movie or a commercial. The combining of multiple audio, video, or data bitstreams into a single bitstream is known as multiplexing. By its very nature, multiplexing introduces jitter. By placing packets from one bitstream between packets from another, time delay variations and thus the possibility of jitter, are introduced.

Jitter may also be introduced in non-multiplexed environments and other processing operations if data and packets are not managed properly. Based on the foregoing, improved methods and systems for processing and transmitting data would be desirable.

SUMMARY OF THE INVENTION

The present invention provides systems and methods for processing data that preserves the timing relationship of the data being processed. In one embodiment, the present invention uses a timestamp. The timestamp stores the timing relationship of data in the bitstream as it appeared before any processing that may alter the timing relationship of the data. The data is then processed. By storing the original timing relationship of data, before any processing that alters the timing relationship of data, the present invention allows for the recreation of the original timing between data. Thus, any jitter introduced by processing the data may be removed or substantially reduced. When the bitstream is transmitted through a processing system of the present invention, the present invention allows the processing system to process data in a manner that changes the timing relationship of the data being transmitted and transmit the data while maintaining the timing relationship of the data as it was received by the processing system.

In one aspect, the present invention relates to a system for transmitting a bitstream. The system comprises a first communication interface configured to receive the bitstream, the bitstream including a timing relationship for data in a portion of the bitstream. The system also comprises a processing apparatus configured to process the data in the bitstream portion in a manner that changes the timing relationship of the data in the bitstream portion. The system further comprises a second communication interface configured to transmit an output bitstream onto a channel, the output bitstream including the timing relationship for data in the portion of the bitstream as received by the first communication interface.

In another aspect, the present invention relates to a method for transmitting a bitstream including a set of packets. The method comprises providing timing information that describes a timing relationship of data in a portion of the bitstream. The method also comprises processing the data in the bitstream portion in a manner that changes the timing relationship of the data. The methods further comprises transmitting an output bitstream onto a first channel, the output bitstream including the timing relationship for data in the bitstream.

In yet another aspect, the present invention relates to a system for providing a bitstream. The system comprises means for identifying timing information in the bitstream, the timing information describing a timing relationship of data in a portion of the bitstream. The system also comprises means for processing the data in the bitstream portion in a manner that changes the timing relationship of the data. The system additionally comprises means for transmitting an output bitstream onto a first channel, the output bitstream including the timing relationship for data in the bitstream.

These and other features and advantages of the present invention will be described in the following description of the invention and associated Figures.

BRIEF DESCRIPTION OF THE DRAWINGS

For a better understanding of the present invention, and to show more clearly how it may be carried into effect, reference will now be made, by way of example, to the accompanying drawings which aid in understanding several embodiments of the present invention.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

The present invention improves data processing and data transmission. In one embodiment, data processing uses a timestamp stored in a bitstream. The timestamp includes timing information that describes the timing relationship of data in the bitstream. Typically, the timestamp is constructed from timing information describing the timing relationship of the data before the bitstream is processed in a manner that changes the timing relationship of the data. The data may then be processed by one or more operations. By storing the original timing relationship of data, before any processing that alters the timing relationship of data, the present invention allows for the recreation of the original timing between data. Thus, any jitter introduced by processing the data may be removed or substantially reduced. Processing may be performed by any processing apparatus appropriately synchronized to use the timing information.

In one embodiment, the invention relates to a processing system. The processing system is configured to process data and transmit in a manner that preserves the timing relationship of the data. When the processing system receives a bitstream, the processing system may create a timestamp based on timing information in the bitstream. As the timing relationship of data in the bitstream may be altered during processing in the processing system, creating a timestamp based on timing information for the bitstream when the bitstream is received allows the timing information to be preserved. In this manner, any jitter introduced by processing the data may be removed before transmission. The data may then be transmitted from the processing system onto a channel while essentially maintaining the timing relationship of the data as it was received.

Figure 1:
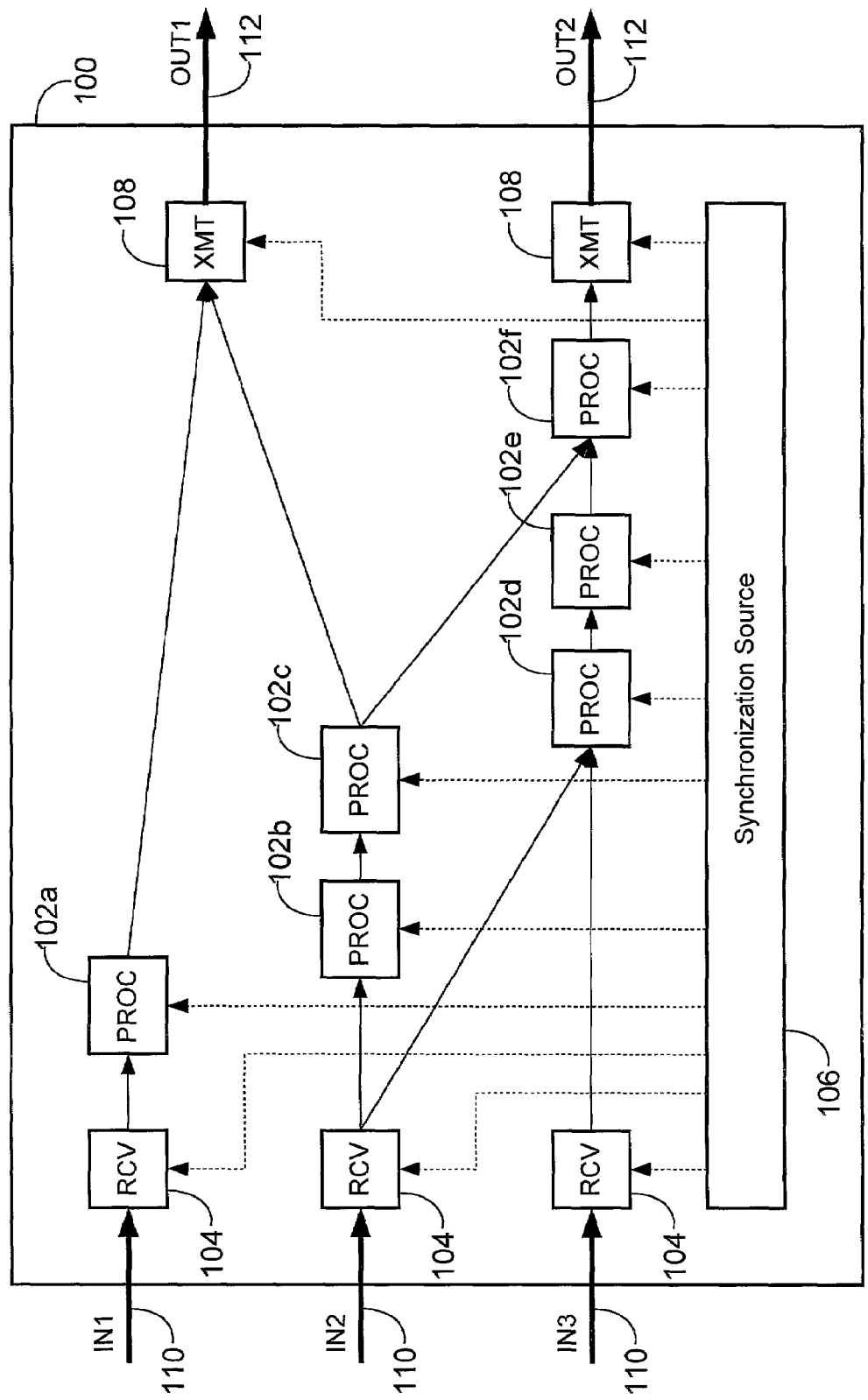
FIG. 1 is an exemplary block diagram of a system capable of jitterless or low jitter processing in accordance with one embodiment of the present invention.

FIG. 1 is an exemplary block diagram of a processing system 100 in accordance with one embodiment of the present invention. While the present invention will now be described as an apparatus composed of units, those skilled in the area will recognize that the present invention encompasses a method, process, or software having as steps the actions performed by each unit and described below. The processing system 100 comprises communication interfaces 104, processing apparatus 102, a synchronization source 106, and communication interfaces 108. The system 100 processes bitstreams received on input lines 110 and transmitted on output lines 112 in a manner that appears essentially jitterless.

The communication interfaces 104 are each configured to receive one or more input bitstreams on input lines 110. The input bitstreams may include audio data, video data, and/or general data. The data typically has a time sensitive relationship in the bitstream, e.g. compressed or uncompressed audio and video data, and may or may not be packetized. The communication interfaces 104 send the input bitstreams to the set of processing apparatus 102.

The processing apparatus 102 comprises a set of processing modules 102a–f. Each processing module 102a–f may process data, or a portion thereof, for an input bitstream. Processing may change the timing relationship of the time sensitive data in the bitstream. As is known to those skilled in the art, there exists a wide variety of packet and bitstream processing functions and operations that can change the timing relationship of data and introduce jitter if not properly managed. Examples include bitstream multiplexing, re-multiplexing, scrambling, descrambling, compression, decompression, transcoding, etc. In addition, processing functions and operations may include packet pacing and timing situations such as bitstream splicing, network adaptation, and robust clock recovery. Generally speaking, the processing functions and operations for the processing apparatus 102 may include any operations that are time sensitive or that may change the timing relationship of the data.

Each communication interface 104 or processing module 102a–f may create a timestamp for a bitstream received from a communication interface 104. The timestamp includes timing information that describes the timing relationship of data in a portion of the bitstream as received by the system 100, as will be described in further detail below. The timing information may be obtained from the input bitstreams and/or the synchronization source 106. Each processing module 102a–f may also add the timestamp to the bitstream. In one embodiment, the timestamp is added to at least one packet in a set of packets included in the input bitstream. In a specific embodiment, the input bitstream is an MPEG-2 compressed bitstream and the processing apparatus is configured to add the timestamp to a transport packet in the MPEG-2 bitstream.

The synchronization source 106 is coupled to each of the processing modules 102a–f. The synchronization source 106 generates a reference time for data and may assist one of the processing modules 102a–f in generating a timestamp. In one embodiment, the timing information produced by each of the processing modules 102a–f is relative to the reference time provided by the synchronization source 106. In this case, the synchronization source 106 provides a common reference time within the system 100. The reference time generated by the synchronization source 106 may be advantageous when the bitstream being processed does not contain timing information that may be used in generating a timestamp. In one embodiment, the synchronization source 106 is an STR clock accessible to the processing apparatus 102. In a specific embodiment, the STR clock is a 24 bit counter that runs at 27 MHz.

The processing apparatus 102 may be multiple hardware and/or software structures (as illustrated) and/or a single hardware and/or software structure. In one embodiment, the system 100 shown in FIG. 1 is implemented with one or more video line cards. Each line card behaves as video processing device without any communication interface. In some cases, it may include an appropriate communication interface for digital video such as DVB ASI or SCTE DHEI. In a multiple line card system, each line card is configured to communicate with one or more of the other line cards. Each line card is also synchronized with the synchronization source 106. A line card may also include multiple on-board processors for one or more processing operations. Each of the processing operations may introduce jitter, e.g. communications intensive tasks such as packet switching, media control and management.

Using the timing information that describes the timing relationship of the data as received, the processing apparatus 102 may restore the timing relationship of the data in the portion of the bitstream. The processing apparatus 102 then outputs one or more bitstreams on lines 112 using the communication interface 108. The communication interface 108 is configured to transmit an output bitstream having data that has been processed without introducing jitter. The output bitstream includes the timing relationship for data in the portion of the bitstream as received by the first communication interface 110. Suitable examples for the communication interfaces 104 and 108 include receivers and transmitters that comply with DVB/ASI, SCTE DHEI, Ethernet, ATM, and any other network or point-to-point transmission protocol interface.

The use of jitterless or low jitter processing in accordance with the present invention may be implemented in any processing system where transmission of data is time sensitive. Although the present invention describes jitterless processing occurring strictly within a single device, it is understood that the processing system may include multiple discrete processing devices that are synchronized to provide jitterless processing. In this case, the system as a whole appears to be jitterless or low jitter even if one or more processing devices within the system introduces jitter.

In some multimedia delivery systems, compressed video programs are provided by numerous video content suppliers and delivered to numerous digital receiver/decoders via one or more digital transmission channels. The present invention is well suited for such multimedia delivery systems and may process and transmit data for these systems while introducing no jitter or low jitter and sacrificing end user video quality. When each of the bitstreams are received during transmission by a processing system such as the processing system 100, the system 100 creates a timestamp for each of the bitstreams, if a timestamp is not present. The timestamp uses timing information that describes the timing relationship of the data in the bitstream as received by the system 100. The timestamp preserves the initial timing relationship of the video data for the video programs during processing in the processing system 100. The system 100 may then process data in one or more of the bitstreams—without introducing jitter. For example, the system 100 may remove a bitstream from a multiplex if received as such. Based on a request from a target decoder, the system 100 transmits any one, or a multiplex, of the bitstreams. Regardless of multiplexing status, the system 100 preserves the timing relationship of the video data in each bitstream as it was received.

There are presently a variety of different communication channels for transporting video data. For example, communication channels such as coaxial cable distribution networks, digital subscriber loop (DSL) access networks, satellite, terrestrial, or wireless digital transmission facilities are all well known. Many standards have been developed for transmitting data on the communication channels. For the purposes herein, a channel is defined broadly as a connection facility to convey properly formatted digital information from one point to another. A channel comprises some or all of the following elements: 1) physical devices that generate and receive the signals; 2) medium that carries the actual signals; 3) mathematical schemes used to encode and decode the signals; 4) proper communication protocols used to establish, maintain and manage the connection created by the channel; and 5) storage systems used to store the signals such as semiconductor memories, magnetic tapes and magnetic or optical disks. The concept of a channel includes but is not limited to a physical channel, but also logical connections established on top of different network protocols, such as xDSL, wireless, HFC, coaxial cable, Ethernet, Token Ring, ATM, IP, etc.

In all the figures and discussions for the present invention, it is important to note that the channels and communication interfaces are bi-directional, even though the present invention is described and shown by focusing on a single direction for ease of understanding. In other words, the communication interface 112 acts as a transmitter in FIG. 1, it may also may act as a receiver device in the reverse direction.

In one embodiment, video data is packetized according to a compression format and a timestamp is added to individual packets of a compressed bitstream. In this case, the timestamp describes the intended delivery time for the video payload of each packet in the compressed bitstream. Although the remaining discussion will focus primarily on processing of an MPEG-2 transmission bitstream, the present invention is not limited to processing of an MPEG-2 bitstream, or any other specific compression format. In other words, jitterless processing in accordance with the present invention may be implemented in any public or proprietary compression or other packaging format where transmission of the data is time sensitive, as one skilled in the art will appreciate. Examples of such compression formats include MPEG-1, MPEG-2, MPEG-4, H.261, H.262, H.263, H.263+, Microsoft streaming format, QuickTime, and Real-Networks.

Figure 2:
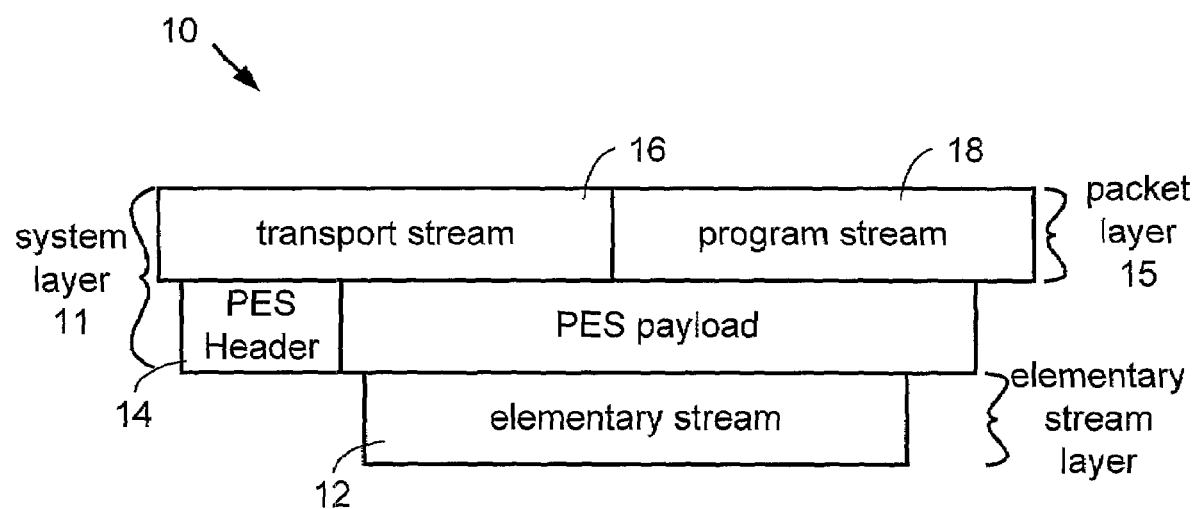
FIG. 2 illustrates a compressed bitstream having an MPEG-2 format.

The present invention is suitable for use with the MPEG-2 compression standard. FIG. 2 briefly describes the structure of an MPEG-2 compressed bitstream 10. The MPEG-2 bitstream 10 consists of two layers: a system layer 11 an elementary stream layer 12. The elementary stream layer 12 typically contains the coded video and audio data. The system layer 11 is defined to allow an MPEG-2 decoder to correctly decode audio and video data, and present the decoded result to a video screen in time continuous manner.

The system layer 11 comprises two sub layers: a packetized elementary stream (PES) layer 14 and a packet layer 15 above the PES layer 14. The PES layer 14 defines how the elementary stream layer is encapsulated into variable length packets called PES packets. The transport layer 15 defines how the PES packets are further packetized into fixed sized transport packets, e.g. packets of 188 bytes to produce a transport stream. The packet layer 15 can be either a transport stream 16 or a program stream 18. The program stream 18 is optimized for use in relatively error free environments and is suitable for applications that may involve software processing of system information such as interactive multimedia applications. Applications of program stream 18 include Digital Versatile Disks (DVD) and video servers. The transport stream 16 is optimized for use in environments where errors are likely such as storage media or transmission in a lossy or noisy channels. Applications using the transport stream 16 include Direct Broadcast Service (DBS), digital or wireless cable services, broadband transmission systems, etc.

The structure and functions of the MPEG-2 syntax are well known to one of skill in the art and are further described by the MPEG-2 specification. The MPEG-2 specification is detailed in ISO/IEC International Standard 13818 "Generic coding of moving pictures and associated audio information", November 1994, which is herein incorporated by reference. The present invention is also suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-4 specification, described in ISO/IEC International Standard 14496; "Coding of moving pictures and associated audio information", March 2000, which is herein incorporated by reference.

Even though a bitstream typically comprises a combination of audio, video and auxiliary data bitstreams, the processes described herein primarily refer to procedures applied on video data. Although not detailed, it is understood that any audio and auxiliary data, such as compressed audio and auxiliary data related to the output of compressed video data, may also be processed according to the techniques as described herein.

Having briefly discussed exemplary architecture for the processing systems that perform jitterless processing in accordance with some embodiments of the present invention, timing information details in accordance with several specific embodiments will now be described.

Data transmitted using the communication interfaces 110 and 112 is performed using an industry standard 8B/10B-encoding scheme, as one of skill in the art will appreciate. The communication interfaces 110 and 112 are also compatible with DVB/ASI. DVB/ASI is a fixed-frequency serial interface with a clock rate of 270 Mbps that transmits MPEG-2 transport stream data. There is no requirement that the communication interfaces 110 and 112 transmit at a clock rate of 270 Mbps and in fact, higher rates have been achieved. The communication interfaces 110 and 112 are also compatible with the ANSI Fibre Channel standard X3.320 for the encoding of data bytes.

In one embodiment, the present invention modifies the DVB/ASI standard to create a new protocol, referred to herein as DVB Multiple Asynchronous Serial Interface (MASI). MASI extends the DVB/ASI standard to permit the processing of packets that changes the timing relationship of the packets. For example, this allows the communication interface 112 to transmit multiplexed packets while maintaining the timing relationship of the packets as it occurred before the multiplexing. In one embodiment, each multiplexed packet stream of a MASI transmission is an independent MPEG-2 transport stream.

Figure 3:
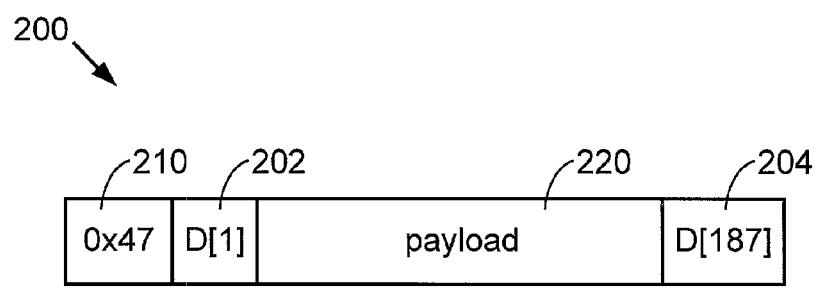
FIG. 3 illustrates a conventional MPEG-2 transport packet.

Referring now to FIG. 3, a conventional MPEG-2 transport packet 200, suitable for use with the DVB/ASI standard, is shown. Packet 200 contains a total of 188 bytes of data. Synchronizing character 210 is the first byte of packet 200 and contains the hexadecimal value 0x47. This value is defined in the MPEG-2 standard and indicates the beginning of a new packet. The remaining 187 bytes of packet 200 contain the payload data 220, ordered from a first byte D[1] 202 to a the final byte D[187] 204. The payload 220 carries the compressed data being transmitted.

Figure 4:
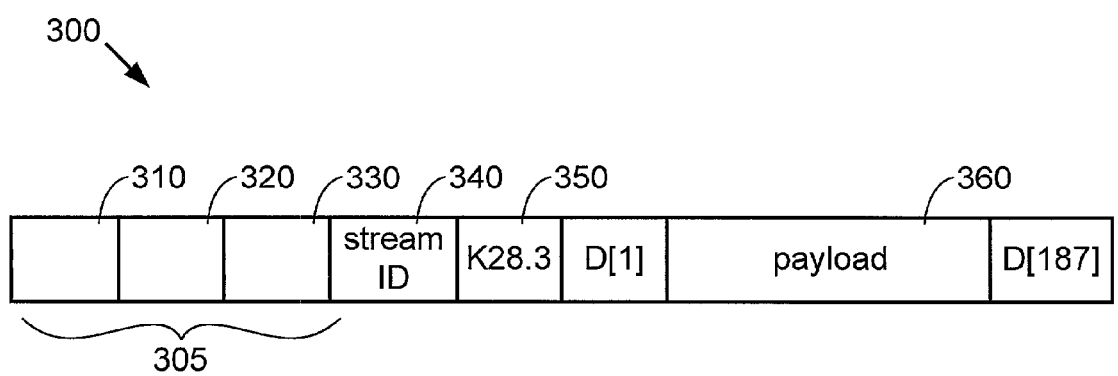
FIG. 4 illustrates a packet in accordance with one embodiment of the present invention.

Referring now to FIG. 4, a MASI packet 300 is shown in accordance with one embodiment of the present invention. Every MASI packet 300 comprises a timestamp 305 that indicates the intended delivery time for payload data 360. The timestamp 305 is created using timing information that describes the timing relationship of the data in the compressed bitstream and is created before any processing that may alter the timing relationship of the data. The timestamp 305 begins with the three bytes of data, namely bytes 310, 320 and 330. Bytes 310, 320 and 330 store timestamp data that indicates the intended delivery time for payload data 360. In this case, the intended delivery time is defined as the least significant 24 bits in the System Time Reference (STR) at the time of transmission of the tenth byte, D[10], of payload data 360. The tenth byte corresponds to the byte that may contain the least significant bit of the Program Clock Reference Base (PCRB) field in a packet. The PCRB field is part of the MPEG-2 standard and consists of a 42 bit time stamp that encodes the timing of the bitstream itself. The PCRB field is used to determine the point in time for creating the timestamp in fields 310, 320, and 330, and allows the MASI packet 300 to maintain compatibility with the MPEG-2 standards. Not all packets may contain a PCRB. For the processing system 100, the MASI packet 300 is produced by the processing apparatus 102. The STR time is provided to the processing apparatus 102 by the synchronization source 106 of FIG. 1.

The MASI packet 300 also includes a stream identifier 340 that associates the MASI packet 300 with a particular bitstream. Stream identifier 340 is a byte length field that contains a value indicating that payload 360 is associated with one of a possible two hundred and fifty-six different bitstreams of data. All MASI packets 300 with the same stream identifier 340 are part of the same MPEG-2 transport stream. Coupled with the stream identifier 340, the STR ensures that the timestamp value stored in bytes 310, 320 and 330 monotonically increases for each packet in the same bitstream.

The timing information, when embedded in an MPEG-2 bitstream, must be done in such a way to avoid any payload emulation. As falsely emulated payload may cause decoding or stream synchronization errors, the present invention replaces any existing synchronization bytes that may lead to payload emulation problems with a new synchronizing byte to signal the beginning of payload. The MASI packet 300 includes a new synchronizing byte 350 used to help avoid payload emulation problems. In one embodiment, the new synchronizing byte 350 contains a synchronizing character represented by the control character K28.3. The value of K28.3 is defined in the ANSI x3.320 standard for fiber optic transmissions. The K28.3 character is used instead of 0x47 to mark a MASI payload synchronization byte since the timestamp bytes 310, 320, 330 may contain the 0x47 value for an extended period of time and may cause false receiver synchronization. The payload 360 carries the compressed data being transmitted.

Figure 5:
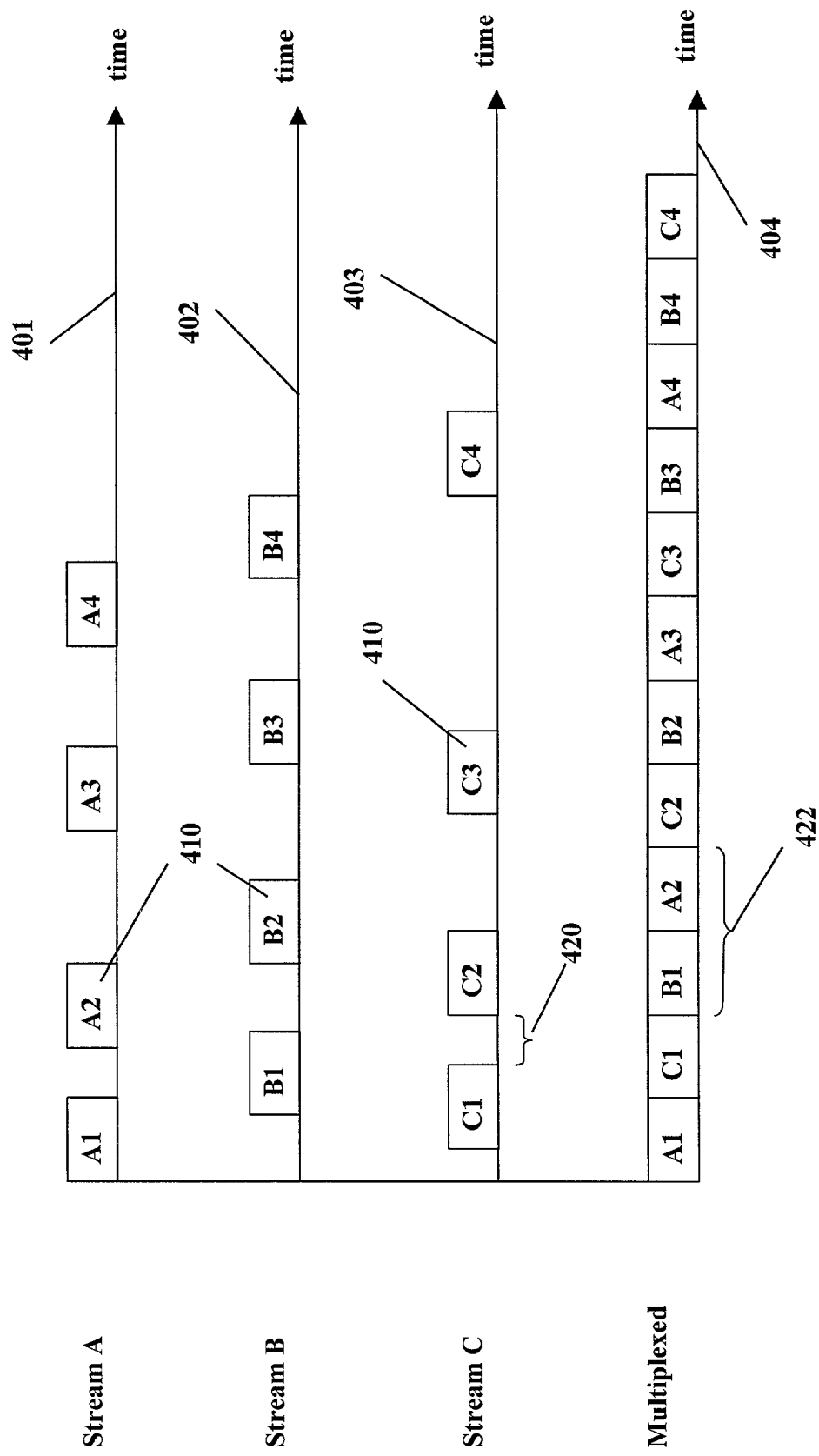
FIG. 5 is a block diagram illustrating the multiplexing of multiple bitstreams of data by the processing system in accordance with a specific embodiment of the present invention.

FIG. 5 is a block diagram illustrating the multiplexing of multiple bitstreams of data by the processing system 100 in accordance with a specific embodiment of the present invention. The processing system 100 receives bitstreams A, B and C (401, 402, and 403, respectively). Each bitstream 401, 402, and 403 contains a plurality of packets 410. Packets 410 from the bitstreams A, B and C are combined to form a single output multiplexed bitstream 404. Packets 410 from each bitstream 401, 402, and 403 are transmitted from the processing system 100 in the order in which they should be delivered to the end user. Thus, packet A1 is transmitted before packet A2 on bitstream 401 as it is should be delivered before packet A2.

Each bitstream 401, 402, and 403 may have different delays between packets 410. When digital video data is compressed, the encoder assumes a particular bit rate profile, whether it is constant bit rate (CBR) or a variable bit rate (VBR). The word "profile" refers to the fact that bit rate may not be constant, but variable under certain constraints, such as peak bit rate, average bit rate, minimum bit rate, etc. Each profile may produce different delays between packets 410.

In the creation of multiplexed bitstream 404, packets 410 are selected in the order that they arrive to the processing system 100. In the example illustrated in FIG. 5, the A1 packet arrives first and becomes the first packet in the output multiplexed bitstream 404. The C1 packet arrives next, and becomes the second packet inserted into output bitstream 404 and so on. This multiplexing of packets does not preserve the original timing between the packets 410 of a bitstream and thus may introduce jitter. For example, the original timing between packets C1 and C2 of bitstream 403 is shown as 420. However, as can be seen in multiplexed bitstream 404, the timing between packets C1 and C2 has increased to the time illustrated by 422. As a result, a module parsing bitstream 404 for the packets from the original bitstream 403, may well encounter jitter due to the variation in time delay between packets introduced by multiplexing.

The present invention, by storing the original timing relationship of data as a timestamp in bytes 310, 320 and 330 before introducing the packets into multiplexed bitstream 404 allows for the recreation of the original timing between packets 410 of the same bitstream. Thus, any jitter introduced by multiplexing may be removed before a bitstream is sent to an end user via the communication interface 112 (FIG. 1).

In one embodiment, processing system 100 supports both DVB/ASI packets 200 (FIG. 3) and MASI packets 300 (FIG. 4). Each packet is preceeded by a minimum of two K28.5 characters. A K28.5 character is a special 10-bit code, often referred to as a "comma character", "synchronization word", or "stuffing byte". The K28.5 character is defined in the ANSI x3.320 standard for fiber optic transmissions. When DVB/ASI packets 200 are used by the present invention, each packet 200 comprises at least 192 bytes. This is achieved by adding additional K28.5 characters anywhere within the packet. These additional characters may or may not be sequential.

Although the discussion so far has focused on adding timing information to the transport stream of an MPEG-2 bitstream, one of skill in the art will appreciate that the processing system 100 is capable of adding timing information to the MPEG-2 Program Stream and MPEG-1 System Stream as well. In general, the present invention may be equally applied to any data transmission bitstream supporting the data structures discussed. Further, although the preferred embodiment makes use of the MASI structure within a DVB/ASI environment, the present invention disclosed is not limited to the DVB/ASI environment nor to multiplexed packets. Generally speaking, any communication system or network subject to jitter may take advantage of the invention described herein.

The methods of this present invention may be implemented on various systems. For example, the invention may be implemented on network devices such routers, headends and/or switches. In a specific embodiment, the systems of this invention may be video manipulation devices such as, for example, specially configured headend models VN 5900 and VN 2900 available from Cisco Systems Video Networking Canada Corporation of Waterloo, Ontario, Canada. In another specific embodiment, the systems of this invention may be specially configured routers such as, for example, specially configured router models available from Cisco Systems, Inc. of San Jose, Calif. In yet another specific embodiment, the systems of this invention may be specially configured CMTSs such as, for example, specially configured models in the uBR-7200 series of CMTSs available from Cisco Systems. A general architecture for some of these machines will be given below. In an alternative embodiment, the methods of this invention may be implemented on a video streaming server, a cache server, a web server, or a general-purpose network host machine such as a personal computer or workstation. Further, the invention may be at least partially implemented on a card (e.g. an interface card) for a network device or a general-purpose computing device.

Figure 6:
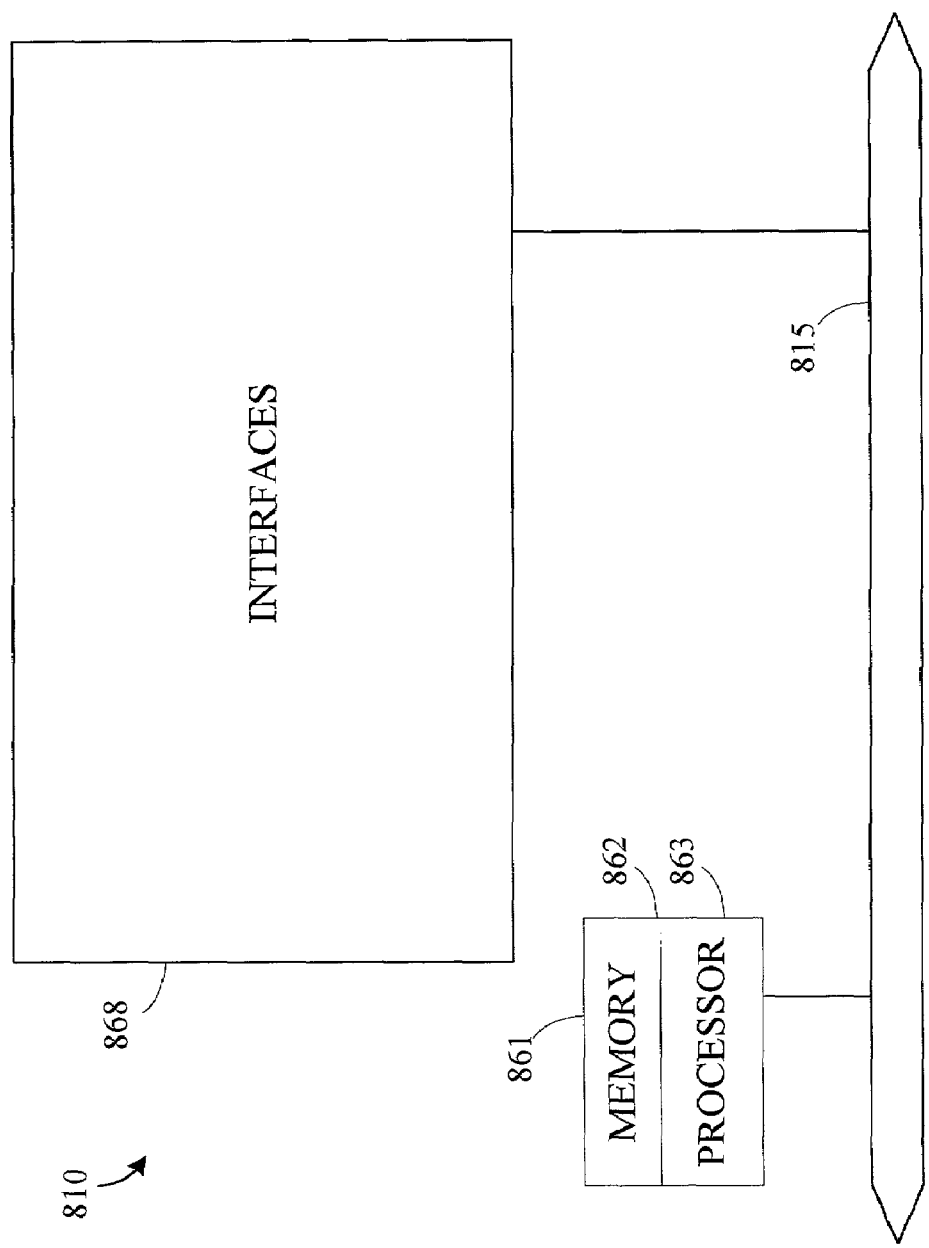
FIG. 6 is a block diagram of a router that may be used in accordance with one embodiment of the present invention.

Referring now to FIG. 6, a high level block diagram of an exemplary general purpose router 810 suitable for implementing the present invention includes a master central processing unit (CPU) 862, interfaces 868, and a bus 815 (e.g. a PCI bus). When acting under the control of appropriate software or firmware, the CPU 862 is responsible for such router tasks as routing table computations and network management. It preferably accomplishes all these functions under the control of software including an operating system (e.g. the Internetwork Operating System (IOS®) of Cisco Systems, Inc.) and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a preferred embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 861) configured to store program instructions for the network operations and other functions of the present invention described herein. The program instructions may specify an operating system and one or more applications, for example. Such memory or memories may also be configured to store data bitstreams, data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the invention has been described with reference to certain specific embodiments, there are alterations, permutations, and equivalents which fall within the scope of this invention which have been omitted for brevity's sake. It is therefore intended that the scope of the invention should be determined with reference to the appended claims.

What is claimed is:

1. A network device for transmitting a bitstream, the network device comprising:
   a first communication interface configured to receive the bitstream, the bitstream including a timing relationship for data in a portion of the bitstream;
   a processing apparatus configured to a) process the data in the bitstream portion in a manner that introduces jitter in the data and b) create a timestamp that preserves the timing relationship of the data as the data was received at the first communication interface; and
   a second communication interface configured to transmit an output bitstream onto a channel, the output bitstream including the timestamp with timing information of the data as the data was received at the first communication interface and the data including jitter introduced by the processing apparatus.

2. The network device of claim 1 wherein the processing apparatus is configured to multiplex, re-multiplex, de-multiplex, encode, transcode, scramble, and de-scramble the data.

3. The network device of claim 1 further including a synchronization source configured to provide a reference time to the processing apparatus that is used in generating the timestamp.

4. The network device of claim 1 wherein the processing apparatus includes a set of processing modules that may each create the timestamp.

5. The network device of claim 1 wherein the processing apparatus is configured to add the timestamp to at least one packet in a set of packets included in the first bitstream.

6. The network device of claim 5 wherein the bitstream is an MPEG-2 compressed bitstream and the processing apparatus is configured to add the timestamp to a transport packet in the MPEG-2 bitstream.

7. The network device of claim 6 wherein the processing apparatus is configured to replace a synchronization byte in the bitstream with a new synchronization byte, the new synchronization byte signalling the beginning of payload data for a payload portion of the bitstream.

8. The network device of claim 6 wherein the second communication interface is configured to transmit the output bitstream according to a DVB/ASI protocol.

9. A method for transmitting a bitstream using a network device, the method comprising:
   receiving the bitstream at the network device;
   creating a timestamp that preserves a timing relationship of data in a portion of the bitstream as the data was received, at the first communication interface;
   processing the data in the bitstream portion in a manner that introduces jitter into the data; and
   transmitting an output bitstream from the network device onto a first channel, the output bitstream including the timestamp with timing information of the data as the data was received at the first communication interface and including the data including jitter introduced by the processing.

10. The method of claim 9 further including adding a synchronization byte that signals the beginning of payload data for a packet included in the bitstream.

11. The method of claim 10 wherein the bitstream includes a set of packets and the method further includes adding the timestamp to at least one packet in the bitstream.

12. The method of claim 9 further including receiving the bitstream from a second channel.

13. The method of claim 12 further including restoring the timing relationship of the data in the portion of the bitstream after processing has occurred using the timing information included in the timestamp.

14. The method of claim 9 wherein the bitstream is an MPEG-2 compressed stream.

15. The method of claim 14 wherein transmitting uses a DVB/ASI protocol.

16. The method of claim 15 the transmitting utilizes an 8B/10B encoding scheme.

17. The method of claim 14 further including adding a stream identifier to the bitstream.

18. The method of claim 9 wherein processing comprises one of multiplexing, re-multiplexing, de-multiplexing, encoding, transcoding, scrambling, and de-scrambling.

19. The method of claim 9 wherein the processing is performed in real-time.

20. A network device for providing a bitstream, the system comprising:
   means for receiving the bitstream;
   means for creating a timestamp that preserves a timing relationship of data in a portion of the bitstream as the data was received at the first communication interface;
   means for processing the data in the bitstream portion in a manner that introduces jitter in the data; and
   means for transmitting an output bitstream from the network device onto a first channel, the output bitstream including the timing information of the data as the data was received at the first communication interface and including the data including jitter introduced by the processing.

21. A network device of claim 20 wherein the means for transmitting comprises a means for transmitting using a DVB/ASI protocol.

22. A network device for transmitting a bitstream, the system comprising:
  a first communication interface configured to receive the bitstream, the bitstream including a timing relationship for video data in a portion of the bitstream;
  a processing apparatus configured to a) process the video data in the bitstream portion in a manner that introduces jitter in the video data and b) create a timestamp that preserves the timing relationship of the video data in the portion of the bitstream as the video data was received; and
  a second communication interface configured to transmit an output bitstream onto a channel, the output bitstream including the timestamp with timing information of the data as the data was received and the video data including jitter introduced by the processing apparatus.

23. The network device of claim 22 wherein the processing apparatus is configured to multiplex, re-multiplex, de-multiplex, encode, transcode, scramble, and de-scramble the data.

* * * * *